United States Patent [19]
Kulkarni et al.

[11] Patent Number: 6,060,116
[45] Date of Patent: May 9, 2000

[54] POLYANILINE IN THE FORM OF AN EASILY DISPERSIBLE POWDER AND ITS USE IN CORROSION PROTECTION AND ELECTROSTATIC DISSIPATION

[75] Inventors: Vaman G. Kulkarni, Charlotte, N.C.; Jamshid Avlyanov, Moraga, Calif.; Tim Chen, Strongsville, Ohio

[73] Assignee: Americhem, Inc., Cuyahoga Falls, Ohio

[21] Appl. No.: 09/150,070

[22] Filed: Sep. 9, 1998

Related U.S. Application Data

[60] Provisional application No. 60/058,231, Sep. 9, 1997.

[51] Int. Cl.[7] .............................. B01J 13/02; B05D 7/00; B32B 9/00

[52] U.S. Cl. ................................ 427/213.3; 427/213.34; 428/402; 428/402.24

[58] Field of Search .......................... 427/213.3, 213.34; 428/402, 402.24

[56] References Cited

U.S. PATENT DOCUMENTS

| | | | |
|---|---|---|---|
| 5,254,633 | 10/1993 | Han et al. | 525/327.4 |
| 5,658,649 | 8/1997 | Wrobleski et al. | 428/213 |
| 5,721,056 | 2/1998 | Wessling | 428/461 |

*Primary Examiner*—Nathan M. Nutter
*Attorney, Agent, or Firm*—Renner, Kenner, Grieve, Bobak, Taylor & Weber

[57] ABSTRACT

Conductive polymer sheathed polymeric particulate powders comprise a polymeric core powder; and from about 5 to about 30 percent by weight of an intrinsically conductive polymer forming a sheath around the core powder. A method of providing corrosion protection to metal substrates comprises applying a conductive polymer sheathed polymeric particulate powder to a metal substrate to form a coating at least about 0.5 mils thick; wherein the conductive powder comprises a polymeric core powder; and from about 5 to about 30 percent by weight of an intrinsically conductive polymer forming a sheath around the core powder, the resulting conductive polymer powder having a particle size greater than about 1 micron.

17 Claims, No Drawings

POLYANILINE IN THE FORM OF AN EASILY DISPERSIBLE POWDER AND ITS USE IN CORROSION PROTECTION AND ELECTROSTATIC DISSIPATION

CROSS-REFERENCE TO RELATED APPLICATIONS

This application claims the benefit of provisional application No. 60/058,231, filed Sep. 9, 1997.

TECHNICAL FIELD

This invention relates to the use of intrinsically conductive polymers (ICPs) as corrosion inhibitors. Specifically, the invention relates to a novel particulate polyaniline with easy dispersibility. More particularly, the invention relates to a core/sheath type polyaniline, wherein, aniline is polymerized in the form of sheath on a core of a polymeric particulate material with a particle size greater than 1 micron.

BACKGROUND OF THE INVENTION

Due to the adverse toxicological properties of corrosion inhibiting pigments based on heavy metals, the industry is searching for environmentally acceptable alternatives. ICPs, such as polyaniline provide such an alternative. ICPs are believed to provide corrosion protection by stabilizing the potential of the metal in the passive region by forming and maintaining a protective oxide layer on the surface of the metal. A key advantage of ICPs is their ability to provide tolerance to pin holes and scratches, due to their conductivity and redox chemistry. Since the coating is electrically conductive, the entire coating acts to passivate any areas of exposed material. With conventional barrier coatings, pin holes and scratches are the main source of coating failure, which necessitates multiple coatings.

Anodic protection of steel with electrochemically deposited polyaniline has been known for over a decade, see for instance, D. W. DeBerry, J. Electrochem, Soc., 132, 1022–26 (1985). Several reports have appeared since then which describe the use for ICPs for corrosion protection of steel. Most of the earlier studies have utilized conductive coatings prepared by electrochemical polymerization directly on the surface of the steel, while other studies have utilized neat solutions of neutral polyaniline in 1-methyl-2-pyrrolidone. These reports disclose various approaches for preparing coatings/coated specimens for evaluating corrosion protection using ICPs.

Thompson et al., Los Alamos National Laboratory report LA-UR-92-360, reported on the use of corrosion protective coatings using ICPs. Mild steel samples were coated with a solution of emeraldine base of polyaniline in 1-methyl-2-pyrrolidone. After drying, the undoped polyaniline was doped to the conducting state. A top coat of crosslinked epoxy was employed to impact abrasion resistance. Significant corrosion resistance was claimed in 3.5% sodium chloride and 0.1 M hydrochloric acid. Such approaches lack industrial application however, due to the limited solubility & stability of polyaniline/NMP solutions.

B. Wessling, Adv. Mater., 6, 226–228 (1994), reported passivation of metals using dispersions of polyaniline. Polyaniline was deposited from pure polyaniline dispersions on metallic samples. The coating procedure was repeated 5 to 20 times to provide thicker coatings. A significant positive shift in corrosion potential along with reduction in corrosion current was reportedly observed. Upon removal of the polyaniline coating, a change in appearance was observed and the presence of passivated layer was confirmed. Multiple coatings are labor intensive and costly and thus not attractive on a industrial scale.

W. Lu, R. L. Eisenbaumer and B. Wessling, Synthetic Metals, 71, 2163–2166, (1995), reported corrosion protection of mild steel in acidic and saline atmosphere using neutral and doped polyaniline coatings, with a epoxy top coat. Neutral polyaniline was applied from NMP solutions, which were then further doped with p-toluene sulfonic acid. Both the neutral and doped polyaniline showed corrosion protection. Corrosion protection provided by doped polyaniline was more significant in acid conditions than saline conditions.

Sitaram et al have reported on corrosion protection of untreated steel using Versicon®, a doped polyaniline, neutral polyaniline and PANDA, a soluble form of polyaniline manufactured by Monsanto. They reported PANDA exhibited significant improvement in corrosion protection, when used as a base coat with a conventional top coat. However, it was interesting to note that both Versicon® and PANDA did not exhibit significant protection, when formulated in to conventional coatings such as epoxy or acrylics. They concluded that polyaniline/PANDA do not function as a pigment.

Recently Miller et al., U.S. Pat. No. 5,648,416 have described corrosion resistant paints using non-conductive conjugated polymers; in particular, neutral polyaniline based alkyd and vinyl systems were evaluated. The coatings exhibited conductivity lower than $10^{-8}$ S/cm. The coatings provided improved corrosion protection using ASTM B-117 when compared to paints containing no polyaniline.

In summary, conductive polymers, specifically polyanillines have been shown to provide corrosion protection to steel. However, there is discrepancy as to the extent of corrosion protection and the effect of the form of the polyaniline and the nature of corrosion environment. The techniques used to coat the substrate to be protected include direct polymerization on the substrate, solution coating techniques or dispersions of ICPs. Sitaram et al., have found that blends of polyaniline with conventional resins are less effective than neat coatings.

Corrosion protective coatings based on intrinsically conductive polymers can have a wide range of commercial applications such as bridges, rebars used in concrete, underground storage tanks, ships, oceanic drilling platform equipment, automotive and several industrial machinery, equipment and metal furniture.

In order for polyaniline and other ICPs to be successful commercially in corrosion prevention, it is apparent that they need to be applied as coatings using practical techniques. Further, these coatings need to be environmentally attractive. In addition to processability of ICPs, the coatings must provide excellent adhesion to the substrate metal, and be durable and environmentally stable in certain applications. Thus, there is a clear need for ICP coatings that can provide enhanced corrosion protection which are environmentally compliant, possess good adhesion to steel, and abrasion resistance.

Electrochemical deposition techniques lack application to large and existing structures. Solutions of polyaniline in NMP have limited shelf life. ICP coatings made by dispersion of polyaniline such as those described in U.S. Pat. Nos. 5,494,609, and 5,648,416, can find application as corrosion inhibiting primers. However, the dispersion techniques are rather involved and may not be practical industrially.

Further, they require polyaniline in the right morphology and composition for optimum dispersion. Due to high oil absorption of polyaniline (Versicon®), it is difficult to formulate high solids, low VOC (volatile organic content) coatings.

Polyaniline and other conducting polymers have been successfully coated on carbon black and other high surface area substrates to achieve higher conductivity. The conductive polymer is polymerized in the microporous substrate and provides high conductivity. The resulting product is black, due to carbon black, and its dispersibility in paint is unknown. Moreover, high surface area/high oil absorption of the conductive polymer restricts the loading and degrades the film properties of the paint. Further, the use and effectiveness of these materials for corrosion prevention is not known.

SUMMARY OF INVENTION

It is therefore, an object of the present invention to provide polyaniline in the form of an easily dispersible powder suitable for paints using conventional paint dispersion equipment.

It is a further object of the invention to provide polyaniline in the form of an easily dispersible powder, which has a very low surface area and oil absorption and permits preparation of a low VOC coating.

It is yet another object of the invention to provide polyaniline which is fusible and suitable for powder coating and fluidized bed coating applications.

It is another object of the invention to provide a method of providing corrosion protection to metal substrates.

At least one or more of the foregoing objects, together with the advantages thereof over the known art relating to powder coating applications, which shall become apparent from the specification which follows, are accomplished by the invention as hereinafter described and claimed.

In general the present invention provides conductive polymer sheathed polymeric particulate powders comprising a polymeric core powder and from about 5 to about 30 percent by weight of an intrinsically conductive polymer forming a sheath around the core powder.

The present invention also provides a method of providing corrosion protection to metal substrates which comprises applying a conductive polymer sheathed polymeric particulate powder to a metal substrate to form a coating at least about 0.5 mils thick; wherein the conductive powder comprises a polymeric core powder; and from about 5 to about 30 percent by weight of an intrinsically conductive polymer forming a sheath around the core powder, the resulting conductive polymer powder having a particle size greater than about 1 micron.

PREFERRED EMBODIMENT FOR CARRYING OUT THE INVENTION

In the present invention, aniline is polymerized onto the surface of ultrafine powders of polymeric materials resulting in a core/sheath product comprising a polymeric core and approximately 5–34% by weight of polyaniline sheath, based upon the weight of the conductive polymer sheathed polymeric particulate powders. Such a material can be highly effective for corrosion prevention when used in paints and primers, as powder coatings, and other coatings or, in fluidized beds. The active conductive polymer on the surface maximizes its effectiveness. Because the substrate/core is polymeric in nature and non-porous, the resulting coated particles offer very low specific gravity and very low surface area. Additive calculations predict the specific gravity to be even lower than pure polyaniline. Because only a small amount of the polyaniline is coated on the surface of the polymeric core, the polyaniline of the current invention offers significant cost savings, while maximizing the effectiveness. Other intrinsically conductive polymers can also be utilized to coat the polymeric sheaths according to the present invention.

Useful intrinsically conductive polymers include polyanilines, such as those described in U.S. Pat. No. 5,160,457, polythiophenes, polypyrroles, polyisothionaphthalenes, polyphenylene vinylenes, polyarylene vinylenes such as those described in U.S. Pat. No. 5,068,060, and substituted (functionalized) derivatives thereof. Preferred for the practice of this invention are conductive polymers comprising doped polyanilines. Although the dopant is not critical, especially preferred intrinsically conductive polymers are those selected from the class of doped polyanilines doped with sulfonic or phosphoric acids.

Intrinsically conductive polymers are described in my earlier U.S. Pat. Nos. 5,217,649, 5,290,483, 5,494,609, 5,595,689 and 5,648,416, the subject matter of which are incorporated herein by reference. One particularly useful polymer is polyaniline or its derivatives, which can be employed in any form.

For the polymeric cores or substrates, while any polymeric core is suitable, thermoplastic materials are employed, generally selected from the group consisting of polyamides. Preferred polyamides include Nylon 6 and Nylon 6/12. Choice substrates are ultrafine polyamide powders (ORGASOL® manufactured by Elf Atochem), prepared by direct polymerization into the powder. Such a material provides uniform and controlled particle size.

Because the core is thermally fusible, the polyanilines of the current invention can be applied directly by fluidized bed techniques, without further preparation. Upon application to a metal substrate and heat treatment (typical for powder coatings), the polyaniline of the current invention can melt and fuse to the substrate, with the active polyaniline in direct contact with the metal and the thermoplastic core providing the needed abrasion and scratch resistance. Since the active polyaniline is in direct contact with the metal substrate, it is expected to provide maximum corrosion protection. Powder coating techniques are also suitable for application. The powder coating may be applied by heating the powder to a temperature sufficient to melt the thermoplastic polymer core which will, of course, vary depending upon the thermoplastic being utilized.

As such, conventional powder coating techniques are applicable and insofar as these are generally known to those skilled in the art, techniques for application and the like are not unique to practice of the present invention. In addition to the polyaniline of the current invention, the powder coating composition may contain other powder coating resins and additives known in the art. The additives are used to improve flow, leveling and adhesion to the substrate.

Polyaniline of the current invention is polymerized onto the surface of polymeric powders, and therefore, has a significantly larger particle size, greater than 1 micron, (typically 2–40) microns) compared to 50–400 nm for conventional polyaniline prepared chemically. When used as a pigment in conventional paint formulations, it is expected to be easily dispersible using standard dispersion techniques employed in the paint industry. When used as a pigment in paint formulating, in addition to the film forming matrix and liquid medium (solvents or active diluents), the composition can contain optional materials which are known to those of skill in the art for inclusion in coatings and paints. Such materials may be present which alter the physical or mechanical properties of the coating solutions, as coatings eventually cast from the solutions.

Examples include compatible adhesive and adhesion promoters for improving adhesion between the coating and substrate or intercoat adhesion. Illustrative of useful optional materials include rheology modifiers, anti-settling additives, UV stabilizers as well as reinforcing fibers, inert fillers such as clays, micas, silica, odorants, pigments, flame retardants, processing acids, dispersants and the like. When the coating composition contains such additives, the amount of the film forming matrix is reduced by the amount corresponding to the amount of the additive. Furthermore, higher loadings are possible due to lower surface area of the polyaniline. Higher loadings, in addition to offering lower VOC's (volatile organic content) enhance polyaniline contact with the substrate, thus maximizing corrosion protection. Further, the polymeric core provides the much needed abrasion/scratch resistance and toughness to the coating.

The core/sheath structure of the polyaniline of the current invention can offer further advantages, when used as a powder coating. Select dopants such as phosphoric acid, and the like can be used to enhance the bonding of polyaniline to ferrous substrates. On heat treatment, it is believed that the thermoplastic core will melt, resulting in bonding of the polyaniline with the metal and a top coat of thermoplastic barrier and abrasion resistance. Nylons, the preferred polymeric core, also have a good affinity/adhesion to ferrous metals in those areas where the polyaniline (intrinsically conductive polymer) may not have adhered to the metal surface. Coating thicknesses should be at least about 0.5 mil (0.012 mm) thick, up to about 5 mils (0.12 mm).

When used as a pigment in a coating system, the core/sheath polyaniline of the current invention offers the following advantages:

Easy dispersibility and incorporation,

High loadings due to the large particle size and low surface area,

Abrasion resistance and slip character to the coating, due to the polymeric nature, and Environmentally compliant formulations.

The core/sheath polyaniline of the current invention can also find use in conductive coatings and as a conductive filler for thermoplastics, elastomers and thermoplastic elastomers. It can be especially useful as a conductive filler in matrices which are processed at temperatures below the fusion point of the core thermoplastic of the polyaniline of the current invention.

The invention will now be further described in detail by descriptions of specific demonstrations thereof. In the following examples, all parts and percentages are by weight. Preparation of the conductive polymer sheathed polymeric particulate powders of the invention is exemplified, followed by examples of the use of such powders.

EXAMPLE NO. 1

Initially, 7000 grams of water were kept stirring in a large reactor fitted with a stirrer and an oxidation/reduction data acquisition system. Next, 320 grams of Orgasol 2001 UD NAT2, an ultrafine polyamide powder (solution polymerized Nylon 12) manufactured by Elf Atochem, having a mean particle size of 5 microns was stirred in over half hour. Next, 72 grams of aniline were added and allowed to stir until the oxidation potential was stabilized. In separate containers, solutions of 640 grams of dopant, para toluene sulfonic acid (PTSA) in 3500 ml of water and 118 grams of ammonium persulfate in 300 ml water were prepared. PTSA was added to the reactor. Ammonium persulfate was added immediately following the PTSA addition. The reaction mixture was allowed stirred for about 2 hours.

Polyaniline precipitate was filtered, washed with deionized water, followed by a dilute solution of PTSA adjusted to pH 3. Finally, it was washed with a sufficient amount of acetone. The precipitate was dried at 60° C. in an oven. The reaction yielded 375 grams of polyaniline coated nylon 12 and had a conductivity of $2 \times 10^{-2}$ S/cm

EXAMPLE NO. 2

Other preparations similar to Example No.1 were carried out, but with different dopants such as polystyrene sulfonic acid and dodeceyl benzene sulfonic acid. The resulting nylon coated polyaniline had a conductivity of 0.01 S/cm and 0.03 S/cm respectively. It is to be understood that any dopant which is capable of doping polyaniline can be used. The reaction conditions will vary slightly, depending on the solubility of the dopant in water, viscosity etc.

EXAMPLE NO. 3

Next, aniline was polymerized onto the surface of Orgasol 2001 UD Nat1, the ultrafine polyamide powder, manufactured by Elf Atochem, having a mean particle size of 5 microns, to provide approximately a 15% by weight sheath of polyaniline. The resulting product, polyaniline sheathed polymeric particulate powder, was a ultrafine, free flowing green powder with a conductivity of $10^{-2}$ S/cm.

EXAMPLE NO. 4

175 grams of the novel polyaniline sheathed polymeric particulate powder, from Example No. 3 were dispersed in a mixture of 150 grams of epoxy ester and 225 grams of xylene using a high speed mixer. The resulting coating was coated on a steel coupon and allowed to dry overnight. The coating formed a nice film on the metal panel with good adhesion with a surface resistivity of $10^6$ ohms/square.

Thus, it should be evident that the sheathed polymeric particulate powders comprising intrinsically conductive polymers on thermoplastic polymers, according to the present invention, are highly effective in providing corrosion protective coatings having electrical dissipation properties.

EXAMPLE NO. 5

A steel coupon was coated with the novel polyaniline sheathed polymeric particulate powder and heated to 150° and 300° C. At 150° C. the polyaniline turned to a violet shade, but was still powdery. At 300° C., the polyaniline established adhesion to the steel substrate. The test establishes use of the novel polyaniline of the current invention for fluidized bed/powder coating application.

Thus, it should be evident that the polymeric particulate powders sheathed with intrinsically conductive polymers, according to the present invention, are highly effective in providing corrosion protection when used as coatings and/or in coating formulations.

Based upon the foregoing disclosure, it should now be apparent that the use of the particulate powders described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, intrinsically conductive polymers and polymeric core materials according to the present invention are not necessarily limited to those exemplified herein, the examples having been reported merely to demonstrate practice of the present invention. Thus, the scope of the invention shall include all modifications and variations that may fall within the scope of the attached claims.

What is claimed is:

1. A method of providing corrosion protection to metal substrates comprising:
    applying a conductive polymer sheathed polymeric particulate powder to a metal substrate to form a coating at least about 0.5 mils thick; said conductive powder comprising
    a polymeric core powder; and
    from about 5 to about 30 percent by weight of an intrinsically conductive polymer forming a sheath around said core powder, the resulting conductive polymer powder having a particle size greater than about 1 micron.

2. A method of providing corrosion protection, as set forth in claim 1, wherein said step of applying includes heating said powder to a temperature sufficient to melt said thermoplastic polymer core.

3. A method of providing corrosion protection, as set forth in claim 1, wherein said intrinsically conductive polymer is polyaniline.

4. A method of providing corrosion protection, as set forth in claim 1, wherein said polymeric core is a thermoplastic polymer.

5. A method of providing corrosion protection, as set forth in claim 4, wherein said thermoplastic polymer is selected from the group consisting of nylons.

6. A method of providing corrosion protection, as set forth in claim 5, wherein said thermoplastic polymer is a nylon and said intrinsically conductive polymer is polyaniline.

7. A corrosion inhibiting paint composition comprising:
    a conductive polymer sheathed polymeric particulate powder including a polymeric core powder and an intrinsically conductive polymer forming a sheath around said core powder; and
    a film forming matrix, wherein said conductive polymer sheathed particulate powder is dispersed in said film forming matrix.

8. The corrosion inhibiting paint composition, as set forth in claim 7, further comprising a liquid medium selected from the group consisting of water, organic solvents and active diluents.

9. The corrosion inhibiting paint composition, as set forth in claim 7, wherein said conductive polymer sheathed particulate powder further comprises a dopant that enhances the bonding of said conductive polymer sheathed particulate powder to ferrous substrates.

10. The corrosion inhibiting paint composition, as set forth in claim 9, wherein said dopant is phosphoric acid.

11. The corrosion inhibiting paint composition, as set forth in claim 7, further comprising a material selected from the group consisting of rheology modifiers, antisettling additives, UV stabilizers, reinforcing fibers, inert fillers, and mixtures thereof.

12. The corrosion inhibiting paint composition, as set forth in claim 11, wherein said inert fillers are selected from the group consisting of clays, micas, silica, odorants, pigments, flame retardants, processing aids, dispersing aids, and mixtures thereof.

13. An electrically conductive coating composition comprising:
    a conductive polymer sheathed polymeric particulate power including a polymeric core powder and an intrinsically conductive polymer forming a sheath around said core powder; and
    a film forming matrix, wherein said conductive polymer sheathed particulate powder is dispersed in said film forming matrix.

14. The electrically conductive coating composition, as set forth in claim 13, further comprising a liquid medium selected from the group consisting of water, organic solvents and active diluents.

15. The electrically conductive coating composition, as set forth in claim 13, further comprising at least one material selected from the group consisting of rheology modifiers, antisettling additives, UV stabilizers, reinforcing fibers, inert fillers.

16. The electrically conductive coating composition, as set forth in claim 15, wherein said inert fillers are selected from the group consisting of clays, micas, silica, odorants, pigments, flame retardants, processing aids, dispersing aids, and mixtures thereof.

17. An electrically conductive composition comprising:
    a conductive polymer sheathed polymeric particulate powder including a polymeric core powder and an intrinsically conductive polymer forming a sheath around said core powder; and
    a processible polymer, wherein said conductive polymer sheathed particulate powder is dispersed in said processible polymer, said processible polymer being selected from the group of thermoplastics, elastomers and thermoplastic elastomers.

* * * * *